United States Patent [19]
Hester et al.

[11] 3,822,464
[45] July 9, 1974

[54] METHOD OF JOINING A TUBE TO A ROLL FORGED SHEET
[75] Inventors: William F. Hester; Frank A. Schumacher, both of Louisville, Ky.
[73] Assignee: General Electric Company, Louisville, Ky.
[22] Filed: Mar. 26, 1973
[21] Appl. No.: 345,003

[52] U.S. Cl. .................... 29/460, 29/470.5, 29/516, 285/292, 285/382.2
[51] Int. Cl. ...................... B23p 3/00, B23p 19/04
[58] Field of Search ...... 29/460, 516, 458, 157.3 V, 29/470.5; 285/382.2 X, 292 X

[56] References Cited
UNITED STATES PATENTS

| | | | |
|---|---|---|---|
| 1,911,775 | 5/1933 | Smith et al. | 29/517 |
| 1,935,425 | 11/1933 | Wiggins | 29/460 UX |
| 2,678,853 | 5/1954 | Reeder | 29/460 UX |
| 2,949,875 | 8/1960 | Adams | 29/157.3 V UX |
| 3,068,563 | 12/1962 | Reverman | 29/458 |
| 3,124,874 | 3/1964 | Woolley | 29/458 |
| 3,208,136 | 9/1965 | Joslin | 29/458 |
| 3,343,252 | 9/1967 | Reesor | 29/458 |

Primary Examiner—Charlie T. Moon
Attorney, Agent, or Firm—Francis H. Boos

[57] ABSTRACT

A method of joining a metal tube to a member comprising roll forged sheets formed to provide a tubular passageway which comprises punching a hole in at least one of the sheets in communication with the passage, inserting a tubular member into the passageway sized to provide a radial clearance therebetween, crimping the sheets into engagement with the tube on opposite sides of the hole and circumferentially of the tube, introducing a heat-curable resin adhesive through the hole to substantially fill the space between the crimped areas, reducing the area of the sheet including the hole into hole-sealing engagement with the tube and thereafter curing the adhesive.

4 Claims, 6 Drawing Figures

METHOD OF JOINING A TUBE TO A ROLL FORGED SHEET

BACKGROUND OF THE INVENTION

The present invention relates to a method of adhesively joining a metal tube to a member comprising roll forged sheets formed to provide a tubular passageway therebetween.

The use of adhesives, such as epoxy resin adhesives, for joining metal tubes is well known. For example U.S. Pat. No. 3,068,563-Reverman discloses a method of joining a metal tube to another metal tube or to a metal member having an internal passage. In accordance with the teachings of the Reverman patent, a first tube or member having a passage therein is prepared to receive a second tube with a small but definite clearance between the two contiguous surfaces. An adhesive such as an epoxy resin is applied either to the exterior of the second tube or to the interior surface of the telescoping passage after which the second tube is inserted into the passage. The first tube or member is then worked to reduce the diameter thereof substantially throughout the extent of the inner tube and at the same time groove or crimp the outer tube or member to mechanically interlock the two components. Finally, the adhesive is heated to curing temperatures. As is also taught in the Reverman patent, the outer member, that is the member with the larger passage, may be a heat exchanger such as an evaporator comprising a passage formed between two roll forged metal plates or sheets. Such heat exchangers are well known and are described, for example, in U.S. Pat. Nos. 2,662,273-Long; 2,933,905-Simmons and 3,004,329-Peterson et al. In the manufacture of such heat exchangers, two sheets are bonded by roll forging employing a "stop" material to define the desired configuration of a passage between the sheets. Thereafter, the area of the sheet defining the passage is hydraulically expanded to a substantially tubular shape. However, due to this method of manufacture, the interior surfaces of the passage in a roll forged sheet member is not truly cylindrical either in its as-formed shape or after expansion, using for example an expansion tool of circular cross section as described in the aforementioned U.S. Pat. No. 2,933,905. Specifically at the areas or points where the two sheets are joined, the interior surfaces of the passage deviate from a truly circular shape forming two tapering "inlet" areas at these points. As the result, when a tube is inserted into such passage, the interior of the passage and the exterior of the mating tube are not truly concentric but form or define relatively small but nevertheless significant triangular-shaped zones or voids. In the manufacture of tubular joints following the teachings of the Reverman patent, these voids are not always completely filled with adhesive and any air pockets remaining in these areas may prevent the resultant joints from being truly hermetic.

It is a primary object of the present invention to provide an improved method for adhesively joining a metal tube to a roll forged sheet passage which assures a complete filling of the aforementioned voids with the resin adhesive and hence the formation of a hermetic joint.

SUMMARY OF THE INVENTION

In accordance with the illustrated embodiment of the present invention, there is provided a method of adhesively joining a metal tube to the passage in a roll formed sheet member which comprises punching a hole in at least one of the sheets, preferably both sheets, in communication with the passage, inserting an end portion of a tube into the passage so as to provide a radial clearance therebetween and crimping the sheets into engagement with the tube at spaced areas on opposite sides of the hole or holes and circumferentially of the tube in order to mechanically anchor the tube within the passage. Thereafter, a heatcurable resin adhesive is introduced under pressure through the hole or holes to displace the air within the joint and substantially fill the space between the crimped areas including any voids in the joint. The areas of the sheets including the hole or holes are then crimped or mechanically worked into engagement with the exterior surface of the tube in order to seal the hole and prevent escape of the adhesive. The assembly is then heated to cure the adhesive. Preferably, during the hole sealing operation of the sheets, the areas of the sheets between the crimped points are also mechanically compressed into substantial engagement with the exterior surface of the tube, thereby reducing the layer of adhesive between the two components to a thin film.

DESCRIPTION OF THE DRAWING

In the accompanying drawing.

DESCRIPTION OF THE PREFERRED EMBODIMENT

Figure 1:
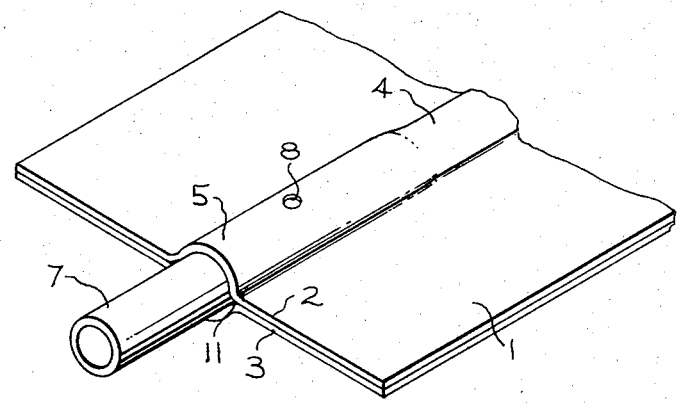
FIG. 1 is a perspective view illustrating the joint components at one of the initial steps in the formation of an adhesive joint in accordance with the present invention.
Figure 2:
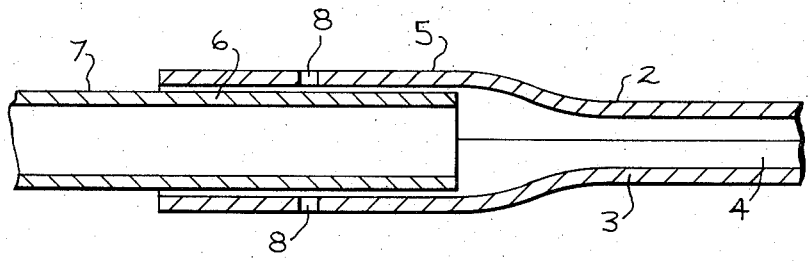
FIG. 2 is a sectional view taken along line 2—2 of FIG. 1.

With reference to FIG. 1 of the accompanying drawing, there is shown an assembly including a roll forged sheet member 1 comprising sheets 2 and 3, of aluminum or the like, roll forged or bonded together excepting selected areas defining a fluid passage 4. An end of the passage 4 terminating at the edge of the member 1 is sized or more specifically enlarged, as indicated by the numeral 5, to receive, as shown in FIGS. 1 and 2, the end portion 6 of an aluminum or copper tube 7, with a slight radial clearance between the exterior surface of the tube and the interior surface of the enlarged passage end portion 5. The assembly thus far described is similar to that disclosed in the aforementioned Reverman patent.

In accordance with the present invention, and either prior to or after the formation of the passage 4, a hole 8 is punched in one and preferably both of the sheets, the hole or holes as illustrated in FIG. 2 being in the area of the intended joint. For convenience in punching, the holes 8 in the two sheets may be punched at the same time so that they are, in effect, coaxial and on opposite sides of the joint of the enlarged passage 5.

Figure 3:
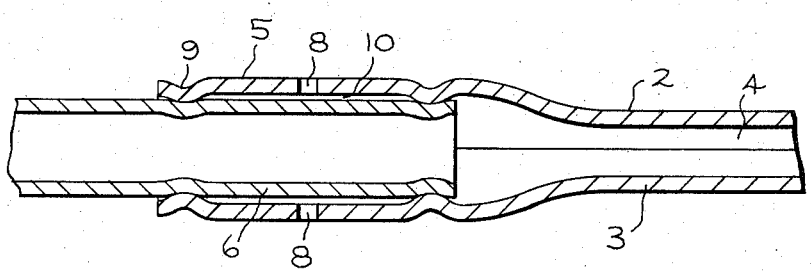
FIG. 3 is a view similar to FIG. 1 illustrating the mechanical anchoring of the two components of the joints.

After insertion of the end portions 6 of the tube 7 into the sized end portion 5 of the sheet passage, the sheets 2 and 3 are crimped into engagement with the exterior surface of the tube end 6 at points spaced from and on opposite sides of the holes 8. As illustrated in FIG. 3 of the drawing, this working of the sheets is preferably carried to an extent that each of the arcuate grooves 9 formed by the crimping operation in the sheets is also carried into and slightly crimps the tube 7 so as to form a firm mechanical bond between the two components.

As a result of the crimping operation, the sheets are in firm mechanical engagement with the tube end 6 substantially about the entire circumferences of the grooved areas 9 but are spaced as indicated by the numeral 10 from the exterior surfaces of the tube between the crimped points. This spacing is uniform except for the out-of-round configuration of the roll forged sheet passage 4. Due to the manner in which the passage is made in the forged sheet structure, V-shaped voids indicated by the numeral 11 in FIG. 1 are present between the exterior surfaces of the tube 7 and the interior surfaces of the passage in the sheet member at the points the sheets 2 and 3 are joined.

Figure 4:
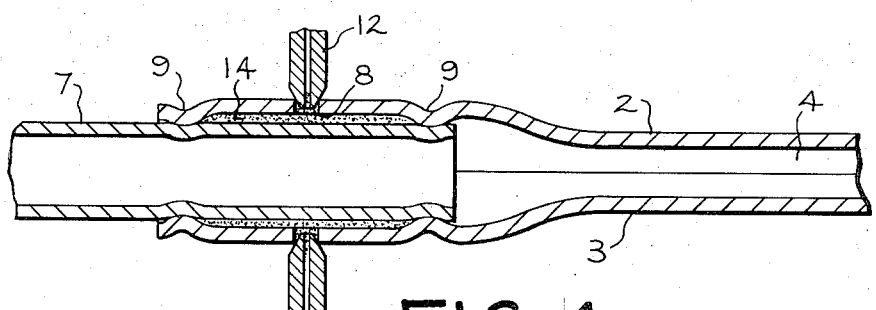
FIG. 4 illustrates one means for introducing adhesive into the joint area.

Following the mechanical joining of the two members, and as shown in FIG. 4, an epoxy resin adhesive is pumped into the joint area through one or both holes 8 through needle-like nozzles 12 until the adhesive, indicated by the numeral 14, completely fills the space 10 including the void areas 11.

During the filling of the joint, the relatively viscous adhesive initially encompasses the tube end 6 in the vicinity of the holes 8 and then flows towards the ends of the joint displacing the air which escapes through the crimped joints 9, and particularly areas 11 within these joints. Because of its viscoisty, the flow of adhesive through these areas is minimized. The present method also avoids the messy prior art procedure of pre-applying adhesive to the tube and having some of it scraped from the tube during assembly of the joint components.

Figure 5:
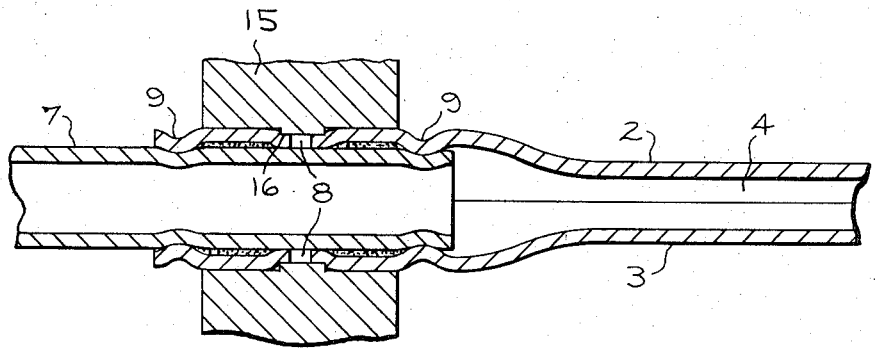
FIG. 5 is a view similar to FIGS. 2, 3 and 4 illustrating the mechanical working of the joint area after introduction of the adhesive.
Figure 6:
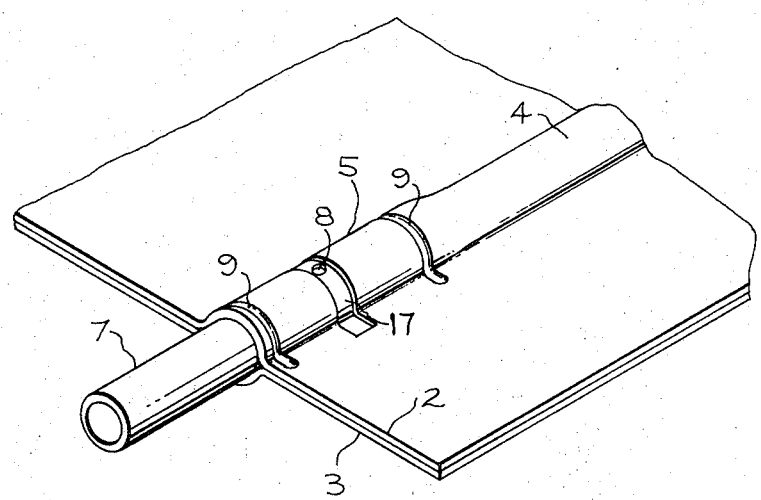
FIG. 6 is a perspective view similar to FIG. 1 illustrating the final joints.

In the next step, illustrated in FIG. 5 of the drawing, the opposed faces of the sheets 2 and 3 between the crimps 9 are worked to reduce the size of the passage 5 between the crimps 9. The dies 15 employed for this purpose also include projections 16 adapted to press or crimp the areas of the sheets 2 and 3 in the vicinity of, and including, the holes 8 into hole-sealing engagement with the adjacent surfaces of the tube end 6 thereby sealing the holes and preventing against escape of the adhesive. This additional hole sealing crimp is indicated by the numeral 17 in FIGS. 5 and 6 of the drawing, FIG. 6 also illustrating in perspective the shape of the final joint including the anchoring crimps 9. The hole sealing crimp 17, in addition to the sealing of the holes 8, also materially adds to the effect of the general working of the sheets 2 and 3 between crimps 9 into substantial engagement with the tube to further insure a compression of the fluid adhesive into the triangular shaped voids 11 and a complete filling thereof. As a final step the entire assembly is heated to cure the adhesive and complete the hermetic sealing of the joint.

Adhesive-bonded joints prepared in this manner have been found to be more reliable and to have burst strength, i.e., under fluid pressure, substantially greater than joints prepared by the previously used "buttered" tube process.

While there has been shown and described a specific embodiment of the present invention it will be understood it is not limited thereto and it is intended by the appended claims to cover all such modifications as fall within the true spirit and scope of the invention.

We claim:

1. The method of adhesively joining a metal tube to a member comprising roll-bonded sheets formed to provide a tubular passageway therebetween comprising the steps of:

punching a hole in at least one sheet in communication with said passageway;

inserting an end portion of said tube into said passageway sized to provide radial clearance therebetween;

mechanically working said sheets into engagement with said tube at spaced areas on opposite sides of said holes and circumferentially of said tube;

introducing a heat-curable resin adhesive through one of said holes to substantially fill the space between spaced areas;

pressing the portions of said sheets including said hole into hole-sealing engagement with said tube;

and thereafter curing said adhesive.

2. The method according to claim 1 in which said sheets are crimped into engagement with said tube under conditions such that adjacent areas of said tube are also crimped.

3. The method according to claim 1 in which there is a hole in each of said sheets.

4. The method according to claim 3 in which all tube-overlapping portions of said sheets are mechanically worked into engagement with said tube during the hole-sealing operation.

* * * * *